(12) United States Patent
Wei et al.

(10) Patent No.: US 12,062,387 B2
(45) Date of Patent: Aug. 13, 2024

(54) OPTICAL STORAGE MEDIUM, METHOD FOR PREPARING OPTICAL STORAGE MEDIUM, AND SYSTEM

(71) Applicant: HUAWEI TECHNOLOGIES CO., LTD., Guangdong (CN)

(72) Inventors: Jingsong Wei, Shanghai (CN); Jun Xu, Nanjing (CN); Yang Wang, Shanghai (CN); Renqi Liu, Shenzhen (CN); Hongwei Tang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/197,465

(22) Filed: May 15, 2023

(65) Prior Publication Data
US 2023/0282234 A1    Sep. 7, 2023

Related U.S. Application Data

(63) Continuation of application No. PCT/CN2021/130479, filed on Nov. 13, 2021.

(30) Foreign Application Priority Data

Nov. 16, 2020    (CN) .......................... 202011278986.0

(51) Int. Cl.
*G11B 7/24038*    (2013.01)
*G11B 7/24062*    (2013.01)
(Continued)

(52) U.S. Cl.
CPC .......... *G11B 7/268* (2013.01); *G11B 7/24062* (2013.01); *G11B 7/243* (2013.01);
(Continued)

(58) Field of Classification Search
CPC ............ G11B 7/24038; G11B 7/24062; G11B 2007/24314
See application file for complete search history.

(56) References Cited

U.S. PATENT DOCUMENTS

| 5,761,188 A | 6/1998 | Rosen et al. |
| 6,511,788 B1 | 1/2003 | Yasuda et al. |
| (Continued) | | |

FOREIGN PATENT DOCUMENTS

| CN | 1352456 A | 6/2002 |
| CN | 1094631 C | 11/2002 |
| (Continued) | | |

OTHER PUBLICATIONS

Blu Ray Disc Association: "White Paper Blu ray Disc, 1.C Physical Format Specifications for BD ROM", Internet Citation, May 1, 2005(May 1, 2005), total:35pages.

*Primary Examiner* — Elizabeth E Mulvaney
(74) *Attorney, Agent, or Firm* — WOMBLE BOND DICKINSON (US) LLP (57) ABSTRACT

An optical storage medium, a method for preparing an optical storage medium, and a system are provided. In this application, the optical storage medium includes a substrate and at least one data layer, the data layer includes a recording layer and a spacer layer, the recording layer is located on the spacer layer, and the data layer is located above the substrate. The recording layer may store data, the recording layer includes an area in which a phase change material is distributed and an area in which no phase change material is distributed, and the two different areas may indicate different data.

19 Claims, 3 Drawing Sheets

(51) Int. Cl.
  *G11B 7/243* (2013.01)
  *G11B 7/26* (2006.01)
(52) U.S. Cl.
  CPC ............... *G11B 2007/24314* (2013.01); *G11B 2007/24316* (2013.01); *G11B 2220/2541* (2013.01)

(56) References Cited

U.S. PATENT DOCUMENTS

| | | |
|---|---|---|
| 2003/0179693 A1 | 9/2003 | Ootera |
| 2005/0106508 A1 | 5/2005 | Shintani et al. |
| 2006/0275712 A1 | 12/2006 | Anzai et al. |
| 2008/0187861 A1* | 8/2008 | Meinders ............... G11B 7/261 |
| 2012/0201110 A1* | 8/2012 | Inoue ....................... G11B 7/09 |

FOREIGN PATENT DOCUMENTS

| | | |
|---|---|---|
| CN | 1460071 A | 12/2003 |
| CN | 1719529 A | 1/2006 |
| CN | 101044566 A | 9/2007 |
| CN | 101097743 A | 1/2008 |
| CN | 101640048 A | 2/2010 |
| CN | 102629476 A | 8/2012 |
| CN | 109326308 A | 2/2019 |
| CN | 110989295 A | 4/2020 |
| JP | 2002184032 A | 6/2002 |
| JP | 2005251249 A | 9/2005 |
| JP | 2006079710 A | 3/2006 |
| JP | 2006107588 A | 4/2006 |
| JP | 2008126603 A | 6/2008 |
| JP | 2008226287 A | 9/2008 |
| JP | 2012164380 A | 8/2012 |
| KR | 20050073486 A | 7/2005 |
| WO | 2012117671 A1 | 9/2012 |
| WO | 2014136486 A1 | 9/2014 |
| WO | 2020195283 A1 | 10/2020 |

* cited by examiner

OPTICAL STORAGE MEDIUM, METHOD FOR PREPARING OPTICAL STORAGE MEDIUM, AND SYSTEM

CROSS-REFERENCE TO RELATED APPLICATIONS

This application is a continuation of International Application No. PCT/CN2021/130479, filed on Nov. 13, 2021, which claims priority to Chinese Patent Application No. 202011278986.0, filed on Nov. 16, 2020. The disclosures of the aforementioned applications are hereby incorporated by reference in their entireties.

TECHNICAL FIELD

This application relates to the field of communication technologies, and in particular, to an optical storage medium, a method for preparing an optical storage medium, and a system.

BACKGROUND

With advent of a communication era, a data amount increases explosively, which poses a higher requirement on data storage. Currently, optical storage, magnetic storage, and semiconductor storage are mainly used storage technologies. An optical storage medium has advantages such as a long storage life, low maintenance costs, energy saving, and environmental protection, and a Blu-ray disc is one of typical optical storage media.

Data is written into a recording layer of the Blu-ray disc through a laser, so that a status of a phase change material at the recording layer changes, for example, an area in which the status changes represents data "1", and an area in which no status changes represents data "0". In the Blu-ray disc, more quantities of recording layers correspond to a larger capacity. On a premise that a transmittance of the recording layer is ensured, the quantity of recording layers increases, and a differentiation between the area in which the status changes and the area in which no status changes at the recording layer decreases, that is, a signal contrast decreases. As a result, data cannot be accurately read from the Blu-ray disc subsequently. If the quantity of recording layers is controlled within a small range, the capacity of the Blu-ray disc is restricted.

SUMMARY

This application provides an optical storage medium, a method for preparing an optical storage medium, and a system, to increase a capacity of the optical storage medium.

According to a first aspect, an embodiment of this application provides an optical storage medium. The optical storage medium includes a substrate and at least one data layer, the data layer includes a recording layer and a spacer layer, the recording layer is located on the spacer layer, and the data layer is located above the substrate. In other words, the spacer layer and the recording layer are sequentially located above the substrate. The recording layer may store data, the recording layer includes an area in which a phase change material is distributed and an area in which no phase change material is distributed, and the two different areas may indicate different data. For example, the area in which the phase change material is distributed may indicate data "1", and the area in which no phase change material is distributed may indicate data "0"; or the area in which the phase change material is distributed may indicate data "0", and the area in which no phase change material is distributed may indicate data "1". The spacer layer can isolate the recording layer and another layer (such as the substrate and another recording layer) in the optical storage medium, to avoid contact between the recording layer and the another layer.

In the optical storage medium, the area in which the phase change material is distributed and the area in which no phase change material is distributed can indicate different data, so that the recording layer can store data. In the optical storage medium provided in this embodiment, because there is an obvious difference between the area in which the phase change material is distributed and the area in which no phase change material is distributed, when more data can be stored as a quantity of recording layers in the optical storage medium increases, a better degree of differentiation can still be ensured between the area in which the phase change material is distributed and the area in which no phase change material is distributed. This can ensure that data is correctly read and written. Therefore, the optical storage medium provided in this embodiment can provide more recording layers, to increase the capacity of the optical storage medium.

In an embodiment, the optical storage medium may include a plurality of data layers stacked above the substrate.

In the optical storage medium, the optical storage medium can include the plurality of stacked data layers, so that the optical storage medium has more recording layers that can store data, to increase the capacity of the optical storage medium.

In an embodiment, components of the phase change material include antimony (Sb) and tellurium (Te).

In the optical storage medium, the phase change material whose components include antimony Sb and tellurium Te is an inorganic phase change material. After a phase change occurs on the inorganic phase change material, a material status is stable, so that the phase change material can better indicate data.

In an embodiment, a thickness range of the recording layer is {10 nanometers, 50 nanometers}, that is, a thickness of the recording layer is between 10 nanometers and 50 nanometers, or may be equal to 10 nanometers or 50 nanometers.

In the optical storage medium, the thickness of the recording layer is small, so that when a thickness of the optical storage medium is fixed, the optical storage medium can include more recording layers, to increase the capacity of the optical storage medium.

In an embodiment, a thickness range of the spacer layer is {10 micrometers, 30 micrometers}, that is a thickness of the spacer layer is between 10 micrometers and 30 micrometers, or may be equal to 10 micrometers or 30 micrometers.

In the optical storage medium, the thickness of the spacer layer is small, so that a proportion of the spacer layer in the entire optical storage medium can be decreased, and a proportion of the recording layer can be increased. The quantity of recording layers is increased, to further increase the capacity of the optical storage medium.

In an embodiment, a quantity of data layers ranges from {30, 100}, that is, the quantity of data layers may be equal to 30, or may be 100, or may be between 30 and 100.

In the optical storage medium, the quantity of data layers can reach a large range, to ensure that the optical storage medium can store a large amount of data.

In an embodiment, the optical storage medium further includes a reflection layer. The reflection layer is located between the data layer and the substrate. If there are a plurality of data layers, the reflection layer is located between the substrate and a data layer closest to the substrate. The reflection layer may reflect, to the data layer, light projected to the optical storage medium.

In the optical storage medium, the reflection layer is configured to reflect servo light projected to the optical storage medium, so as to help write or read data.

In an embodiment, the optical storage medium further includes a protective layer, the protective layer is located on a recording layer farthest from the substrate, and the protective layer is configured to prevent the recording layer from being in contact with the outside.

In the optical storage medium, the protective layer can isolate the recording layer from the outside, to ensure that the recording layer is not damaged.

According to a second aspect, an embodiment of this application provides a method for preparing an optical storage medium. For beneficial effects, refer to descriptions of the first aspect. Details are not described herein again. In the method, first, a first spacer layer is prepared above a substrate; then, a layer of phase change material is grown on the first spacer layer as a first phase change layer; and after the layer of phase change material is grown, data can be written on the phase change material. For example, to-be-stored first data may be written on the phase change material at the first phase change layer through a laser, and the laser is projected to the phase change material. A phase change occurs on the phase change material at a projection point, and no phase change occurs at a place that is not projected. After writing is performed, a part, of the phase-change material at the first phase-change layer, on which data is not written may be removed. In some embodiments, a part, of the phase-change material, on which the laser is not projected may be removed.

In an embodiment, there are many manners of clearing the phase change material, from the first phase change layer, on which the first data is not written. For example, a wet etching manner may be used, and the phase change material is cleared with development liquid, to dissolve the part, of the phase change material, on which the data is not written. Certainly, a dry etching manner may also be used. Any manner to remove the phase-change material, at the first phase-change layer, on which the first data is not written is applicable to this embodiment of this application.

In an embodiment, after the phase change material, at the first phase change layer, on which the first data is not written is removed, a recording layer is formed. Then, a plurality of recording layers may be prepared on the recording layer with similar operations. That is, a second spacer layer and a second phase change layer including the phase change material are prepared, then to-be-stored second data is written onto the phase change material at the second phase change layer through a laser, and then, a part, at the second phase-change layer, on which the data is not written is removed. The foregoing operation may be repeated, to form a structure in which the second spacer layers and the recording layers are stacked.

In an embodiment, there are many methods for preparing the first spacer layer. For example, the first spacer layer may be prepared above the substrate via spin coating.

In an embodiment, a reflection layer may be first prepared on the substrate to reflect light projected to the optical storage medium, and then the first spacer layer is prepared on the reflection layer.

In an embodiment, after a phase change material, at a last phase change layer, on which data is not written is cleared, a protective layer may be prepared on the phase change layer, and the protective layer is configured to prevent the phase change material from being in contact with the outside.

In an embodiment, components of the phase change material include at least antimony Sb and tellurium Te.

In an embodiment, a thickness range of the phase change material is {10 nanometers, 50 nanometers}, that is a thickness of the phase change material is between 10 nanometers and 50 nanometers, or may be equal to 10 nanometers or 50 nanometers.

In an embodiment, a thickness range of the first spacer layer or the second spacer layer is {10 micrometers, 30 micrometers}, that is thicknesses of the first spacer layer and the second spacer layer are not less than 10 micrometers, and are not greater than 30 micrometers.

According to a third aspect, an embodiment of this application further provides a storage system. The system includes the optical storage medium provided in any one of the foregoing aspects and a data reading apparatus. The data reading apparatus can read data from the optical storage medium.

DESCRIPTION OF EMBODIMENTS

Before an optical storage medium, a method for preparing an optical storage medium, and a system that are provided in embodiments of this application are described, some basic concepts related to an optical disc are first described.

1. Data Recording Manner of the Optical Disc

The optical disc implements data writing (which may also be referred to as data recording) through a laser. When the laser is projected to a recording layer of the optical disc, a material forming the recording layer is physically or chemically changed, and a status of the material forming the recording layer is changed. Recorded data is characterized by the status of the material.

In embodiments of this application, the material forming the recording layer is a phase change material. When the laser is projected to the recording layer, statuses of some materials in the phase change material are converted from an amorphous state to a crystalline state. The phase change material in the crystalline state may represent and record one type of data, for example, represent data "1". An area in which no phase change material is distributed at the recording layer may represent another type of data, for example, represent data "0". Certainly, the phase change material in the crystalline state may also represent data "0", and an area in which no phase change material is distributed at the recording layer may represent data "1".

For example, when data is written into an optical disc, two beams of light (a type of the light may be a laser) are required. For ease of distinguishing, one beam of light is a writing beam and is used to write the data, and the other beam is servo light and is used to indicate a track of the data during data writing.

Servo light is projected to a reflection layer on a substrate of the optical disc. Whether the servo light is projected to a groove on the substrate is determined based on intensity of reflected light of the servo light (if the intensity of the reflected light of the servo light projected to the groove reaches a preset value, or if the intensity of the reflected light of the servo light that is not projected to the groove does not reach a preset value, for example, may be close to zero). If the servo light is projected to a position of the groove on the substrate, the position of the groove is the track of the data recorded in the optical disc. The writing beam is projected to the recording layer, and the data is written onto the track of the recording layer along the track indicated by the servo light. In this way, the data recorded at the recording layer is recorded along the track indicated by the groove.

2. Data Reading Manner of the Optical Disc

After data is written into the optical disc, reflectivities of areas representing different data at a recording layer are different. The data is read from the optical disc through a signal formed by a reflectivity change form "1" and "0" after a light beam arrives at the recording layer.

For example, when data is read from an optical disc, two beams of light (a type of the light may be a laser) are required. For ease of distinguishing, one beam of light is reading light and is used to read the data, and the other beam is servo light and is used to indicate a track of the data during data reading.

The servo light is projected to a reflection layer on a substrate of the optical disc, and whether the servo light is projected to a groove on the substrate is determined based on intensity of reflected light of the servo light. If the servo light is projected to the groove on the substrate, a position of the groove is the track of the data recorded in the optical disc. A data reading apparatus may project the reading light to a recording layer, and read, along the track indicated by the servo light, the data recorded by the recording layer along the track. In other words, the data reading apparatus may determine, based on a reflectivity change of the reflected light projected by the reading light to the recording layer, the data recorded by the recording layer along the track.

Figure 1:
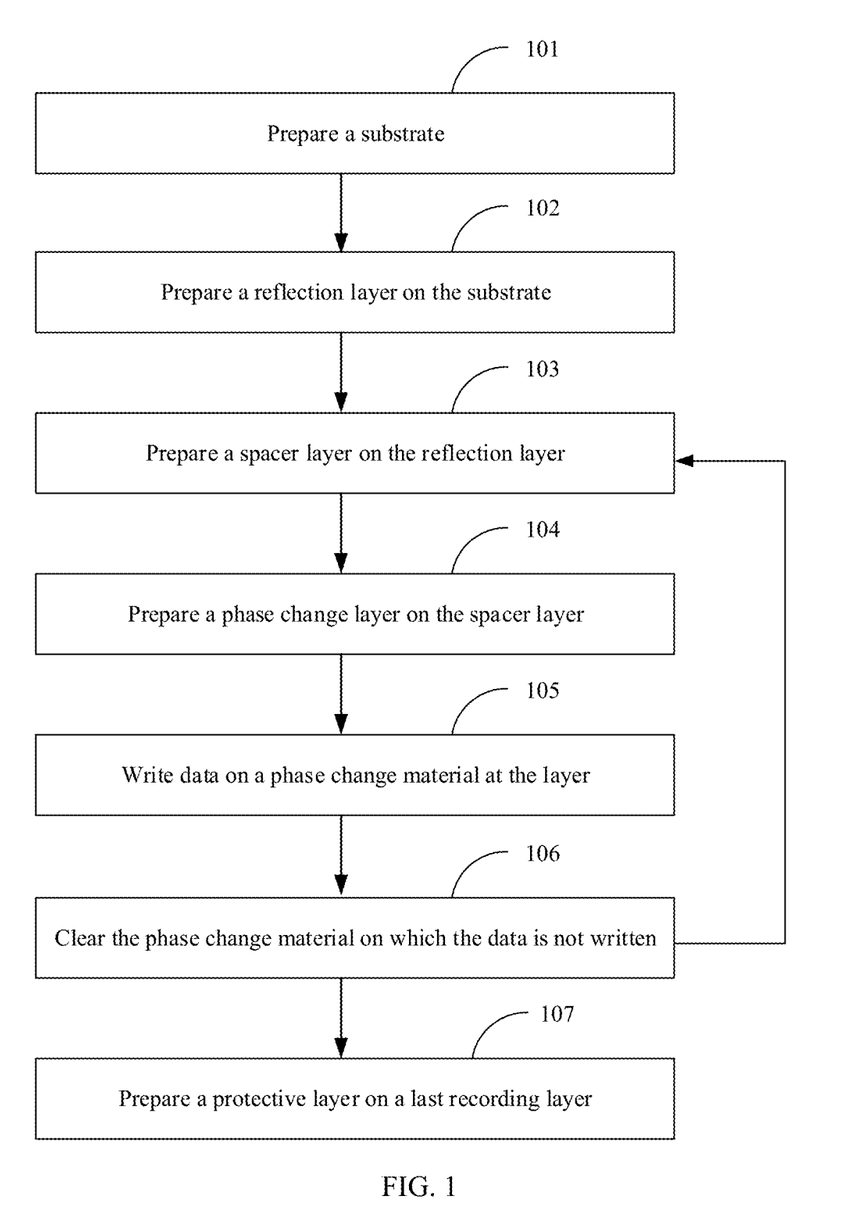
FIG. 1 is a flowchart of a method for preparing an optical storage medium according to this application.

With reference to the accompanying drawings, a method for preparing an optical storage medium provided in embodiments of this application is described below by using an example in which the optical storage medium is an optical disc. FIG. 1 shows a method for preparing an optical disc according to an embodiment of this application. The method includes the following operations.

Operation 101: Prepare a substrate.

A preparation manner of the substrate of the optical disc is not limited in this embodiment of this application. In this embodiment of this application, an optical disc master disk with a groove may be selected, a child disk of the optical disc master disk is used as a template, and polycarbonate (PC) is injected into the child disk by using an injection molding machine, to form the substrate with a groove. The optical disc master disk is a mold for preparing the child disk, and the master disk matches the child disk. In other words, a protruding part on the master disk corresponds to a concave part in the child disk. A material of the child disk is not limited in this embodiment of this application. For example, an electroforming nickel child disk with high stability and strength may be selected to be as the material.

There is the groove on the substrate of the optical disc, and the groove is configured to provide a track of data recorded in the optical disc. In other words, all data recorded in a recording layer is recorded along the track.

Operation 102: Prepare a reflection layer on the substrate.

After the substrate is prepared, the reflection layer may be prepared on the substrate. The reflection layer is configured to reflect light projected to the optical disc, so that the light can be reflected into recording layers in the optical disc. Therefore, a strong reflection capability is required at the reflection layer, and a material with good reflection performance can be used at the reflection layer. A material at the reflection layer is not limited in this embodiment of this application. For example, a metal material such as silver or aluminum may be used, a metal compound material such as zinc dioxide and titanium dioxide may be used, or some alloy materials may be used.

In this embodiment of this application, the reflection layer prepared on the substrate is configured to: reflect, during data writing and data reading, servo light projected to the reflection layer, and determine, based on intensity of the servo light, whether to project the servo light to a position of the groove on the substrate. This can find a track required for data writing or a track of data during data reading.

There are a plurality of manners of preparing the reflection layer. For example, plasma enhanced chemical vapor deposition (PECVD) (the method may be used to prepare a metal compound material), magnetron sputtering (the method may be used to prepare a metal material and an alloy material), and pulsed laser deposition (PLD) may be used.

Operation 103: Prepare a spacer layer on the reflection layer.

The spacer layer is configured to isolate subsequently prepared recording layers, so that the recording layers are not in contact with another layer. Before each recording layer is prepared, one spacer layer may be prepared first, so that any two recording layers are not in contact with each other. When data needs to be read from the optical disc subsequently, crosstalk does not occur between data read from different recording layers through light.

A composition material and a preparation manner of the spacer layer are not limited in this embodiment of this application. A PC may be used, or an organic material such as polymethyl methacrylate (PMMA), polystyrene (PS), polyethylene terephthalate (PET), polyamide (PA), or polyvinyl chloride (PVC) may be used. The spacer layer may be prepared through convenient and low-cost spin coating, or a dense spacer layer may be prepared through chemical vapor deposition or magnetron sputtering.

Operation 104: Prepare a phase change layer on the spacer layer, where the phase change layer includes a phase change material.

The phase change layer may be prepared on the spacer layer, and a material of the phase change layer may be the phase change material. The phase change material (PCM) is a material whose physical status can change within a predefined temperature range. The phase change material may be an inorganic phase change material, for example, a phase change material whose components include antimony Sb and tellurium Te, or the phase change material such as GeSbTe and AgInSbTe. The physical status of the phase change material including antimony Sb and tellurium Te is a crystalline state when a temperature is high, and the physical status of the phase change material including antimony Sb and tellurium Te remains an amorphous state when the temperature is low.

There are a plurality of manners of preparing the phase change material layer. For example, PECVD may be used, or magnetron sputtering may be used.

Operation 105: Write data on the phase change material at the phase change layer.

After the phase change layer is prepared, the data may be written at the phase change layer. In this embodiment of this application, the phase change material at the phase change layer may be heated through a laser in laser writing, a temperature of a heated part of the phase change material increases, and the physical status changes from the amorphous state to the crystalline state. The phase change material in the crystalline state may represent data "1". A temperature of an unheated part of the phase change material remains unchanged, the physical status remains the amorphous state, and the phase change material in the amorphous state may represent data "0". The phase change material in the crystalline state and the phase change material in the amorphous state are formed through laser writing. The phase change material in the crystalline state and the phase change material in the amorphous state may be distributed to represent the data recorded in the recording layer.

Operation 106: Clear, from the phase change layer, the phase change material on which the data is not written, that is, remove the phase change material in the amorphous state, to form the recording layer. The recording layer is configured to record data and is one of the core layers of the optical disc.

After the data is written onto the phase change material at the phase change layer, the phase change material in the amorphous state may be removed with development liquid. In this embodiment of this application, after the data is written, the phase change material at the phase change layer may be immersed in the development liquid. The development liquid can react with a part of the phase change material in an unstable state (namely, the amorphous state), to dissolve the part of the phase change material in the amorphous state, and retain the part of the phase change material in the crystalline state.

After the part of the phase change material in the amorphous state is removed with the development liquid, remaining development liquid at the recording layer may be removed through cleaning, drying, or the like.

After operation 106 is performed, the recording layer is formed on the spacer layer, and only the phase change material in the crystalline state is distributed at the recording layer. Because the part in the amorphous state is removed, the spacer layer below the recording layer is exposed at a position of the part. At the recording layer finally formed in this manner, the phase change material in the crystalline state may represent the data "1", and an area no phase change material exists represents the data "0". Because there is an obvious difference between an area in which the phase change material exists and the area in which no phase change material exists in the recording layer, when a quantity of recording layers in the optical disc increases, the part in which the phase change material exists in the recording layer can still be better distinguished. In other words, when the quantity of recording layers increases, data can still be accurately read from the recording layer. In addition, because there is the part in which no phase change material is distributed at the recording layer, a transmittance of light in the optical disc can also be improved. Further, the quantity of recording layers in the optical disc is possibly increased, to increase a capacity of the optical disc.

Operations 103 to 106 are repeated. In some embodiments, a spacer layer continues to be prepared on the recording layer, after the spacer layer is prepared, a phase change layer continues to be prepared on the spacer layer, data is written onto a phase change material at the phase change layer (corresponding data is written at each phase change layer, and data written at different phase change layers may be the same or different), and a part (namely, the phase change material in an amorphous state) on which data is not written is removed. A spacer layer continues to be prepared on the recording layer, a phase change material layer continues to be prepared on the spacer layer, data is written onto the phase change material, a part on which the data is not written is removed. The operations can be performed cyclically for N times. That is, N spacer layers and N recording layers are prepared.

In an embodiment of this application, one recording layer and one spacer layer can be used as a data layer. The optical disc can include a plurality of data layers, and the plurality of data layers are sequentially stacked above the substrate. In other words, after the reflection layer is prepared on the substrate, a first data layer may be prepared, and then a second data layer is prepared on the first data layer, to form the plurality of data layers. A quantity of data layers is not limited in this embodiment of this application. Compared with an optical disc with a limited quantity of layers, the optical disc in this embodiment of this application has 30 data layers to 100 data layers on a premise that a transmittance of light is ensured.

Operation 107: Prepare a protective layer on a last recording layer, where the protective layer is configured to protect the recording layer and isolate the recording layer from the outside. In this embodiment of this application, a material of the protective layer is limited, for example, may be a shadowless adhesive (UV adhesive).

Figure 2:
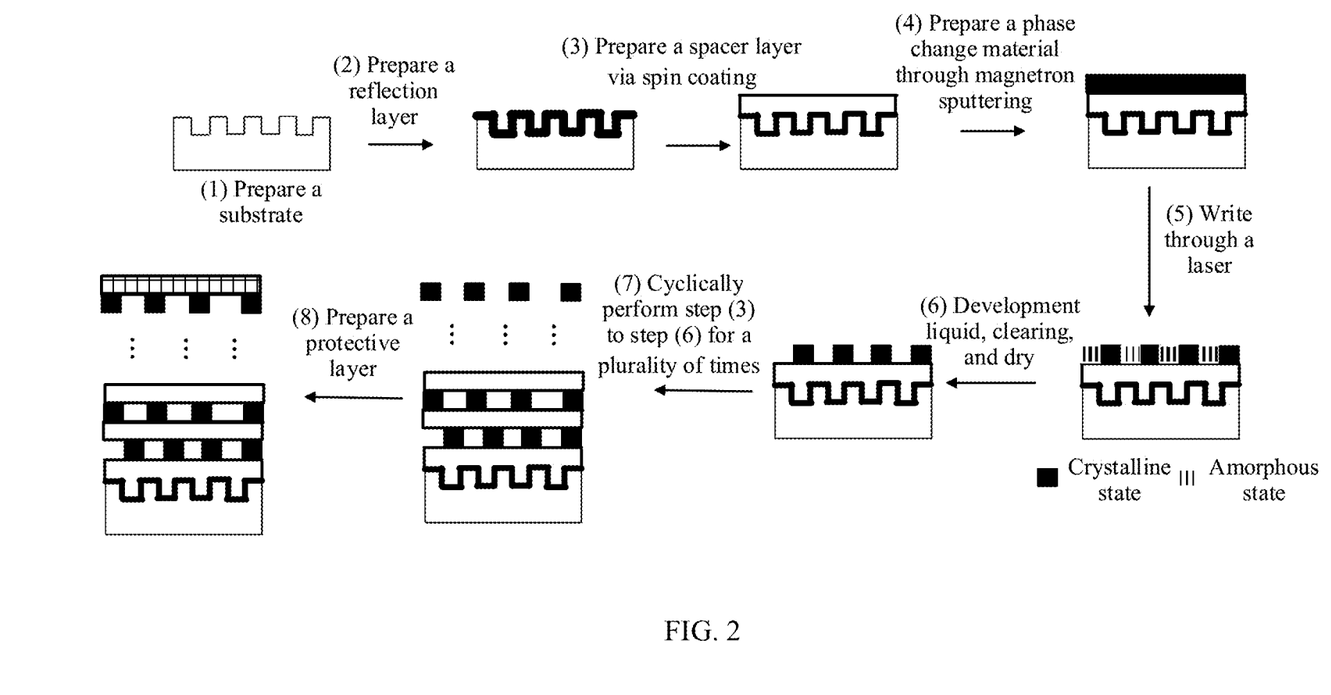
FIG. 2 is a diagram of a method for preparing an optical storage medium according to this application.

To clearly describe the method for preparing the optical disc provided in embodiments of this application, refer to FIG. 2. FIG. 2 is a schematic diagram of a method for preparing an optical disc according to an embodiment of this application. In FIG. 2, (1) Prepare a substrate with a groove. (2) Prepare a reflection layer on the substrate. (3) Prepare a spacer layer on the reflection layer via spin coating. (4) Prepare a layer of a phase change material on the spacer layer through magnetron sputtering. (5) Write data onto the phase change material layer through laser writing on the phase change material, to form the phase change material in a crystalline state and the phase change material in an amorphous state. (6) Then, remove the phase change material in the amorphous state at the phase change material layer with development liquid, and clear and dry residual development liquid, to form a recording layer. (7) Then, continue to prepare a spacer layer on the recording layer, form a recording layer on the spacer layer in the foregoing manner, and prepare N layers repeatedly. (8) Then, prepare a protective layer on a last recording layer.

Figure 3:
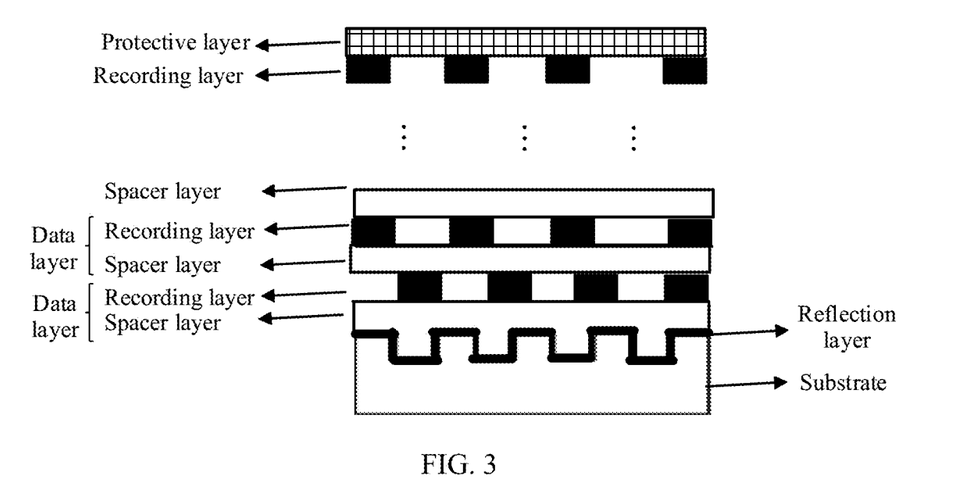
FIG. 3 is a diagram of a structure of an optical storage medium according to this application.

FIG. 3 is a schematic diagram of a structure of an optical disc according to an embodiment of this application. The optical disc includes a substrate and at least one data layer located above the substrate. Each data layer includes one spacer layer and one recording layer.

The spacer layer is configured to isolate the recording layer from another component in the optical disc. The recording layer is configured to record data, and the recording layer includes two different areas. One is an area in which a phase change material is distributed, and the phase change material in the area may be in a crystalline state; and the other is an area in which no phase change material is distributed, no phase change material exists in the area, and the spacer layer below the recording layer may be exposed.

The area in which the phase change material is distributed and the area in which no phase change material is distributed at the recording layer indicate different data.

For example, at the recording layer, the area in which the phase change material is distributed indicates data "1", and the area in which no phase change material is distributed indicates data "0"; or the area in which the phase change material is distributed indicates the data "0", and the area in which no phase change material is distributed indicates the data "1". For descriptions of the phase change material, refer to the foregoing descriptions. Details are not described herein again.

A reflection layer is further included between the substrate and a first data layer. The reflection layer is configured to: reflect light projected to the optical disc, and reflect the light into each recording layer. The reflection layer is set, so that data can be read from the optical disc subsequently.

A quantity of data layers is not limited in this embodiment of this application. There may be one or more data layers. When there are a plurality of data layers, the data layers are stacked above the substrate.

A protective layer may be disposed a recording layer of a last data layer. The protective layer is configured to protect the recording layer, to prevent the recording layer from being in contact with the outside.

In the optical disc, the data layer is a main core part of the optical disc. More data layers indicate a larger capacity of the optical disc and more data that can be recorded by the optical disc. The quantity of data layers may be distributed in an interval of {30, 100}. That is, a quantity of quantity layers is not greater than 100 and is not less than 30. Thicknesses of the recording layer and the spacer layer are not limited in this embodiment of this application. The thicknesses of the recording layer and the thicknesses of the spacer layer are related to a thickness that needs to be reached by the optical disc and the quantity of data layers in the optical disc. On the premise that the thickness that needs to be reached by the optical disc is fixed, for example, the thickness of the optical disc is 1.2 millimeters, more data layers correspond to a smaller thickness of the recording layer and a smaller thickness of the spacer layer. When the thickness of the optical disc is 1.2 millimeters, a thickness range of the recording layer is {10 nanometers, 50 nanometers}, that is, the thickness of the recording layer is not greater than 50 nanometers and is not less than 10 nanometers; and a thickness range of the spacer layer is {10 micrometers, 30 micrometers}, that is, the thickness of the spacer layer is not greater than 30 microns and is not less than 10 microns.

Figure 4:
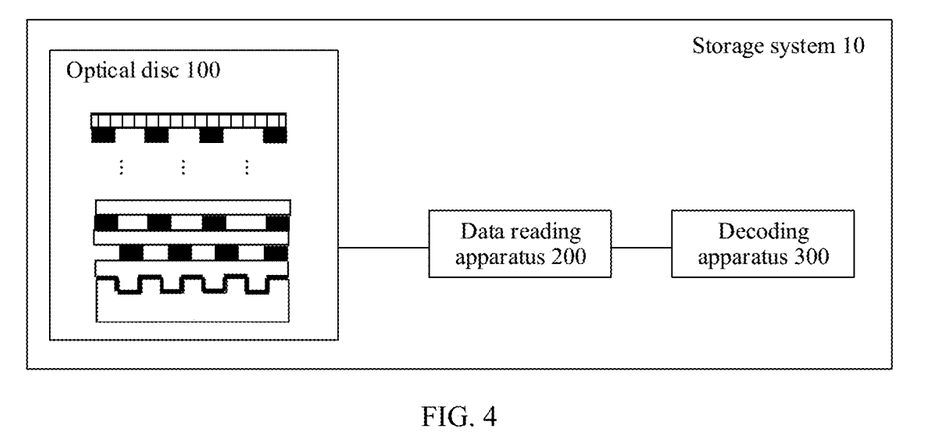
FIG. 4 is a diagram of a structure of a storage system according to this application.

FIG. 4 shows a storage system according to an embodiment of this application. The system 10 includes the optical disc 100 provided in the foregoing embodiment, and may further include a data reading apparatus 200.

The data reading apparatus 200 may read data from the optical disc through projecting a light beam to the optical disc.

In some embodiments, the storage system may further include a decoding apparatus 300. The decoding apparatus 300 may decode the data read by the data reading apparatus, to generate data that can be identified by a user.

It should be noted that only the optical disc is used as an example herein. Another type of optical storage medium that can be prepared by using the method provided in embodiments of this application or has a structure of the optical storage medium provided in embodiments of this application is also applicable to embodiments of this application.

It is clear that a person skilled in the art can make various modifications and variations to embodiments of this application without departing from the scope of embodiments of this application. This application is intended to cover these modifications and variations of embodiments of this application provided that they fall within the scope of the claims of this application and their equivalent technologies.

What is claimed is:

1. An optical storage medium comprising:
    a substrate and a plurality of data layers, wherein the plurality of data layers comprise a data layer, wherein the data layer is located above the substrate, and wherein a quantity of the plurality of data layers is not less than 30 and is not greater than 100;
    wherein the data layer comprises a recording layer and a spacer layer, and the recording layer is located on the spacer layer; and
    wherein the recording layer is configured to store data, the recording layer comprises an area in which a phase change material is distributed and an area in which no phase change material is distributed, and the area in which the phase change material is distributed and the area in which no phase change material is distributed indicate different data.

2. The optical storage medium according to claim 1, wherein the plurality of data layers are stacked above the substrate.

3. The optical storage medium according to claim 1, wherein components of the phase change material comprise antimony (Sb) and tellurium (Te).

4. The optical storage medium according to claim 1, wherein a thickness of the recording layer is not less than 10 nanometers and is not greater than 50 nanometers.

5. The optical storage medium according to claim 1, wherein a thickness of the spacer layer is not less than 10 microns and is not greater than 30 microns.

6. The optical storage medium according to claim 1, wherein the optical storage medium further comprises a reflection layer, the reflection layer being located between the data layer and the substrate, and wherein the reflection layer is configured to reflect light projected to the optical storage medium.

7. The optical storage medium according to claim 1, wherein the optical storage medium further comprises a protective layer, the protective layer being located on the recording layer farthest from the substrate, and wherein the protective layer is configured to prevent the recording layer from being in contact with the outside.

8. A method for preparing an optical storage medium comprising:
    preparing a first spacer layer above a substrate;
    growing a first phase change layer on the first spacer layer, wherein the first phase change layer comprises a phase change material;
    writing to-be-stored first data on the phase change material at the first phase change layer using a laser; and
    clearing, from the first phase change layer, the phase change material on which the first data is not written, wherein the optical storage medium comprises a quantity of a plurality of data layers that is not less than 30 and is not greater than 100, and wherein the plurality of data layers comprise a data layer that includes the first spacer layer and the first phase change layer.

9. The method according to claim 8, wherein the method further comprises:
   cleaning the first phase change layer with developing liquid, to dissolve the phase change material that is at the first phase change layer and on which the first data is not written.

10. The method according to claim 8, wherein the method further comprises:
   preparing a second spacer layer on the first phase change layer;
   growing a second phase change layer on the second spacer layer, wherein the second phase change layer comprises a phase change material;
   writing to-be-stored second data on the phase change material at the second phase change layer using a laser; and
   clearing, from the second phase change layer, the phase change material on which the second data is not written.

11. The method according to claim 8, wherein preparing the first spacer layer above a substrate comprises:
   preparing a reflection layer on the substrate, wherein the reflection layer is configured to reflect light projected to the optical storage medium; and
   spinning coating the first spacer layer on the reflection layer.

12. The method according to claim 10, wherein a plurality of second spacer layers and a plurality of second phase change layers are sequentially prepared on the first phase change layer, and the method further comprises:
   after a phase change material on which the second data is not written and that is at a last second phase change layer is cleared, preparing a protective layer on the last second phase change layer, wherein the protective layer is used to prevent the last second phase change layer from being in contact with the outside.

13. The method according to claim 8, wherein components of the phase change material comprise at least antimony Sb and tellurium Te.

14. The method according to claim 8, wherein a thickness of the phase change material is not less than 10 nanometers and not greater than 50 nanometers.

15. The method according to claim 8, wherein a thickness range of the first spacer layer is not less than 10 microns and is not greater than 30 microns.

16. A storage system comprising:
   an optical storage medium and a data reading apparatus;
   wherein the optical storage medium comprises a substrate and a plurality of data layers, wherein the plurality of data layers comprise a data layer, and the data layer is located above the substrate;
   wherein the data layer comprises a recording layer and a spacer layer, and the recording layer is located on the spacer layer; and
   wherein the recording layer is configured to store data, the recording layer comprises an area in which a phase change material is distributed and an area in which no phase change material is distributed, and wherein the area in which the phase change material is distributed and the area in which no phase change material is distributed indicate different data; and
   wherein the data reading apparatus is configured to read data from the optical storage medium.

17. The storage system according to claim 16, wherein the optical storage medium comprises a plurality of data layers stacked above the substrate.

18. The storage system according to claim 16, wherein components of the phase change material comprise antimony (Sb) and tellurium (Te).

19. The storage system according to claim 16, wherein a thickness of the recording layer is not less than 10 nanometers and is not greater than 50 nanometers.

* * * * *